No. 655,948. Patented Aug. 14, 1900.
M. M. BAILEY.
VEHICLE WHEEL.
(Application filed Jan. 8, 1900.)
(No Model.) 2 Sheets—Sheet 1.
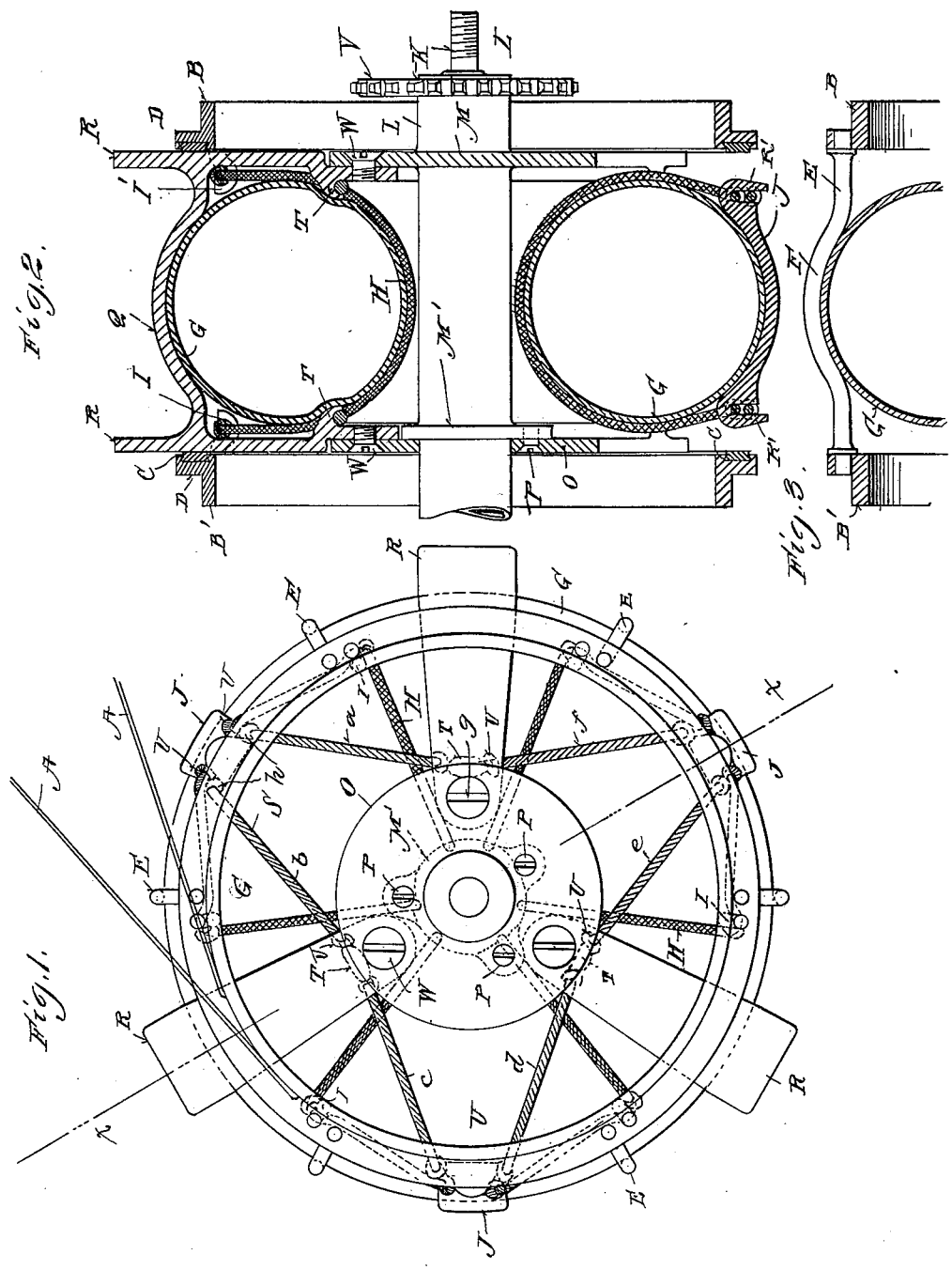

No. 655,948. Patented Aug. 14, 1900.
M. M. BAILEY.
VEHICLE WHEEL.
(Application filed Jan. 8, 1900.)

(No Model.) 2 Sheets—Sheet 2.

Witnesses
W. M. McNair
F. W. Schaefer

Inventor
Marion Milton Bailey
By his Attorney
H. A. Toulmin.

UNITED STATES PATENT OFFICE.

MARION MILTON BAILEY, OF CHILLICOTHE, OHIO, ASSIGNOR OF SEVENTY-ONE ONE-HUNDREDTHS TO J. S. HARSHMAN AND H. E. MURPHY, OF SPRINGFIELD, OHIO.

VEHICLE-WHEEL.

SPECIFICATION forming part of Letters Patent No. 655,948, dated August 14, 1900.

Application filed January 8, 1900. Serial No. 649. (No model.)

*To all whom it may concern:*

Be it known that I, MARION MILTON BAILEY, a citizen of the United States, residing at Chillicothe, in the county of Ross and State of Ohio, have invented certain new and useful Improvements in Vehicle-Wheels, of which the following is a specification, reference being had therein to the accompanying drawings.

This invention relates to certain new and useful improvements in vehicle-wheels.

The general object of this invention is to provide a wheel with a suspended hub and in which there may be relative movement of the hub forward and backward of the center of the wheel proper, whereby in traveling in a forward direction the forward movement of the hub and the weight on the wheel will assist the wheel in its onward movement, while when a retarding effect is applied to the hub such hub will be moved back of the wheel-center proper and the weight on the hub will assist in retarding the onward movement of the vehicle.

My invention also relates to details of construction and arrangement hereinafter appearing, and particularly pointed out in the claims.

Figure 5:
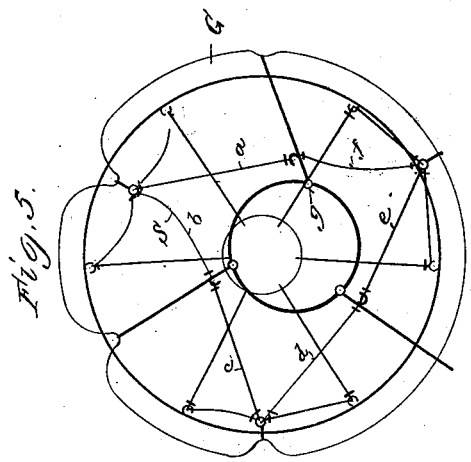
Figure 4:
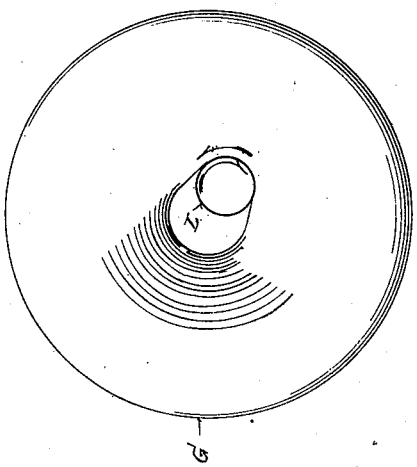
Figure 4:
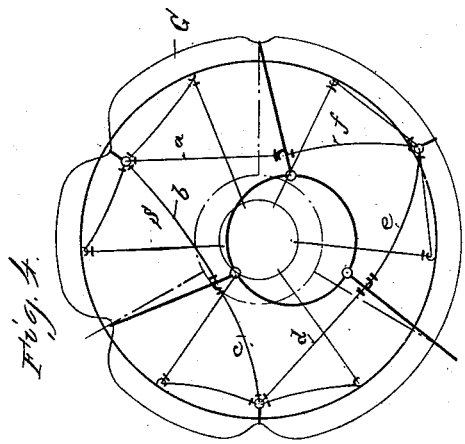
Figure 6:
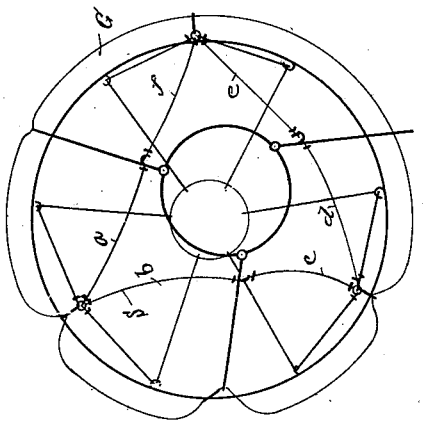

In the accompanying drawings, on which like reference-letters indicate corresponding parts, Figure 1 is a side elevation of a portion of a vehicle-wheel, showing my improvements applied thereto. Fig. 2 is a sectional view on the line *x x* of Fig. 1; Fig. 3, a detail sectional view showing one means of connecting the spoke shells or rings together; Fig. 4, a diagram illustrating the position the hub assumes with respect to the center of the wheel when the load is applied and before the hub is rotated; Fig. 5, another diagram showing the hub-center moved forward of the wheel-center; Fig. 6, a similar view to Fig. 5, but showing the hub moved forward of its center still farther, due to the hub coming in contact with the pneumatic tube and rolling thereon; and Fig. 7, a diagram showing the rolling movement of the hub on the interior of the pneumatic tube.

I am well aware of the fact that it is old to suspend a hub within a wheel structure; but such suspended hub has never been permitted to move either forward or backward of the center of the wheel, and consequently the great advantage obtained by the construction about to be described is lacking in all of such former devices.

The letter A represents the spokes of a vehicle-wheel, adapted to be connected with a rim or felly in the ordinary manner. The inner ends of these spokes are connected to the respective annular rings B B' instead of to the ordinary hub structure. From Fig. 2 it will be observed that these rings are in the form of angle-iron in cross-section and on their inner faces are each provided with a dovetail groove C, within which fits a piece of red hematite or other suitable material for forming a frictional contact with a hub structure, as will shortly appear. These rings are connected by means of cross bars or bridges E, which project into said rings and are secured thereto by upsetting their ends or in any other suitable manner. It will be observed that these cross-bars are each curved outward, as shown at F. The rings and cross-bars form a shell-like structure constituting a portion of the wheel proper and which I will term a "secondary" or "auxiliary" hub, since to it are secured the inner ends of the spokes, as above stated. Within this auxiliary hub is placed a pneumatic tube G, which is held suspended in a cradle formed of cord H, such cord preferably extending over supports I, projecting inward from the ring B' and extending around the pneumatic tube G over the support I', projecting inward from the ring B, opposite the support I. In practice this cord is made of one piece in the form of an endless band and is placed over one of the supports I after coming around the pneumatic tube from the opposite side, across one end of a saddle J, and over another support I and around the pneumatic tube to the opposite side, where it is passed over one of the supports I' and also across the opposite end of the saddle J and over another support I'. Thus with this construction it will be seen that one of the endless cords or bands forms two loops for supporting the pneumatic tube and holding it snugly against the cross bars or bridges E. In practice there are three of such endless cords, although it will readily be understood that more may be employed and that they may also be formed of any suitable material other than cord. The shaft K of the wheel is provided with a hub-sleeve L, which has annular flanges M and M' projecting therefrom. Against this flange M' and upon the sleeve L is fitted an annular ring O, which is secured to the flange M' by means of screws P. (See Fig. 1.) To this annular ring and to the flange M are pivoted hangers Q, which fit within the rings B and B' of the auxiliary hub and extend over the outside of the pneumatic tube G. Projections R extend radially from the hangers and form extensions of their sides. These hangers fit snugly against the friction-surfaces D and act to prevent any relative movement between the wheel proper and the hub proper in a lateral horizontal direction, although freely permitting the relative movement in a substantially vertical and horizontal direction through the plane of the wheel. The extensions R permit a greater amount of movement between the auxiliary hub and hub proper without the parts becoming disarranged in any manner. Between every other pair of bridge-bars E, I have provided a saddle J, as above referred to. At each end such saddle is formed into a hook, as shown at R'. These hooks are for the reception of cords H, as above described, as also another endless cord S, one at each end of the hub. These saddles are held in position on the pneumatic tube or resilient body G by the cords H, which are preferably knotted on each side of the hooks R', and also the supports I and I', respectively, to prevent any movement of the cord, as well as the saddles, such knots being indicated by the letter $h$. The cord S is preferably formed in one continuous band and extends across one of the saddles J down underneath a support F, extends across another saddle J, substantially one-third of the distance around the pneumatic tube H. From this saddle the cord continues and extends beneath another support T and over another saddle and under still another support T back to the first saddle. At each side of the saddle the cord S is knotted, as also each side of the supports T, as shown at U, for the purpose of preventing any movement of the cord relatively to the supports and saddles for the purpose hereinafter appearing. Each of the supports T project from the interior of the hangers Q, as clearly shown in Fig. 2 and in dotted lines in Fig. 1, so that each of the saddles are directly connected with the primary-tube structure. At one end of the sleeve M is rigidly mounted a sprocket-wheel V for driving the wheel, and where such sprocket-wheel is used in a bicycle it is propelled by the ordinary pedal-cranks and sprocket-chain. (Not shown.)

Referring now to the operation of my invention in actual practice, it will be understood that when the hub-sleeve M is rotated it has a tendency to turn independently of the auxiliary hub; but since such hub is connected with the auxiliary hub through the hangers Q and also through the cords S such auxiliary hub will be rotated together with the wheel. Before such rotation of the auxiliary hub and wheel takes place, however, the hub proper will partially rotate, it being understood that the hangers readily permit this by reason of their being pivoted to the hub proper by means of studs W, which extend through the ring O and into the respective hangers. This relative movement of the hub proper with respect to the auxiliary hub will instantly cause the branch $a$ of the cord S to be drawn taut and at the same time loosen the branch $b$ of said cord, which will cause the branch $a$ to pull down upon the saddle J above the axle. This will apply a moving impulse to the auxiliary hub and wheel proper forward of the wheel-center, and since the point of attachment of the branch $a$ to the hub proper is outside of the wheel-center and yet is far removed from the outer rim of the wheel the leverage for propelling the wheel is greatly increased over the ordinary wheel, as in the ordinary wheel the distance from the hub-center to the outer periphery of the wheel constitutes one arm of the lever, while the distance from the hub to the outer periphery of the sprocket-wheel would constitute another arm of the lever. With my construction it will be observed that these levers are more nearly equal. At the same time that the hub proper partially rotates relatively to the auxiliary hub the branches $b$, $d$, $e$, and $f$ will have a tendency to slacken, and as soon as the branch $a$ becomes taut the hub proper will have a tendency to roll about the point $g$, which will cause such hub-center to swing to one side of the wheel-center—say to the side in the direction of movement of the wheel, as illustrated in Fig. 5. This of course will throw the weight applied or supported by the hub proper forward of the wheel-center, and such weight will act as a propelling force to move the wheel forward. In order that this may be accomplished, the resilient body H yields sufficiently for this purpose. When the load is applied to the primary hub, such hub has a tendency to drop down in a vertical line, as illustrated in Fig. 4, and as soon as this occurs the hub-sleeve practically comes in contact with the pneumatic tube, which acts as a supporting-surface for the hub proper, so that as the hub is turned relatively to the auxiliary hub it will ride on said pneumatic tube in the manner indicated in the diagram in Fig. 7. This assists to some extent the hub proper to travel forward of the wheel-center, as above stated. As the primary hub initially drops it will cause the branches *a* and *b*, particularly of the cord S, to become taut and will draw the hangers Q into the pneumatic tube—that is, the pneumatic tube will yield, due to the weight put upon it by the hangers. The instant, therefore, the hub proper is partially rotated some of the pulling force on the branch *b* of the cord S will be lessened, while the branch *a* of such cord will be drawn tighter, as also the branches *e* and *c*; but such latter branches having been slackened somewhat by the weight being applied to the wheel they will offer no resistance to the movement of the hub proper forward of the wheel-center until such a time as the moving of the hub forward of the wheel-center and also circumferentially tightens thereon; but this will not occur until the weight on the wheel produces a propelling effect.

The description relative to the forward movement of the hub applies as well to the movement of the hub back of the wheel-center when the force acting to drive the wheel is reversed. Thus with my invention I not only utilize the weight to assist in propelling the wheel, but I also utilize such weight to assist in retarding the wheel when the direction of the driving force is reversed. This is of great practical importance, particularly when used in connection with bicycles, as it not only assists the wheel to move forward, but in going down hills and steep grades it acts as a brake upon the wheel. It will be understood that the branches *c* and *e* of the cord S take the place of the branch *a* as the wheel rotates, so that the same action on the wheel proper is constantly maintained.

This invention has been thoroughly tested and the statements made herein have been clearly demonstrated, and I wish to be understood as laying broad claim to a vehicle-wheel in which the weight on the wheel acts to accelerate and retard the movement of the wheel, respectively, when the main or primary hub is moved forward or backward of the wheel-center.

Having thus fully described my invention, what I claim as new, and desire to secure by Letters Patent, is—

1. In a vehicle-wheel, the combination with an auxiliary hub, of a primary hub mounted within said auxiliary hub, means for connecting said hubs with each other, and means for moving said primary hub out of a vertical line through the wheel-center and relatively to said auxiliary hub to cause the load to act on the motion of said wheel.

2. In a vehicle-wheel, the combination with an auxiliary hub, and a primary hub suspended within said auxiliary hub, of a pneumatic tube sustained by one of said hubs and suspending the other through intermediate connections, and means for throwing said primary hub forward and backward of the wheel-center, all substantially as shown and described.

3. In a vehicle-wheel, the combination with an auxiliary hub, of a suitably-supported resilient body, a hub proper supported by said resilient body, and means to move said hub proper in advance of the wheel-center whereby the cushioning effect and a forward impulse are imparted to the wheel, substantially as shown and described.

4. In a vehicle-wheel, the combination with an auxiliary hub, of a pneumatic tube supported by said hub, a primary hub suspended within said auxiliary hub from said pneumatic tube, and means for engaging with said auxiliary hub to prevent lateral movement of said primary hub, substantially as shown and described.

5. In a vehicle-wheel, the combination with an auxiliary hub, of a primary hub suspended within said auxiliary hub, a resilient body carried by said auxiliary hub, and suspending means for connecting said primary hub with said resilient body, such means being also adapted to act upon such resilient body to rotate it and said auxiliary hub.

6. In a vehicle-wheel, having an auxiliary hub, of a primary hub consisting of a sleeve mounted on an axle and carrying pivoted hangers, a sprocket-wheel carried by said primary hub and adapted to rotate it, means for connecting said auxiliary hub intermediate of said hangers, said means acting to assist in rotating the wheel proper when the weight and rotary motion are applied to said primary hub, all substantially as shown and described.

7. In a vehicle-wheel, the combination with an auxiliary hub, said auxiliary hub being composed of a pair of rings connected with each other by bridge-pieces, of supports carried by said rings extending inward, a pneumatic tube mounted within said auxiliary hub, loops of cord engaging with said supports and supporting said pneumatic tube, a primary hub mounted within said auxiliary hub and having hangers pivoted thereto, said hangers extending between said rings of the auxiliary hub and across said pneumatic tube, saddles carried by said pneumatic tube intermediate of said hangers, means to hold said saddles with said primary hub, all substantially as shown and described.

8. In a vehicle-wheel, the combination with an auxiliary hub consisting of rings and crosspieces, of a primary hub consisting of a hub-sleeve carrying a pair of flanges, an annular ring for one of said flanges and adapted to be secured thereto, hangers pivoted to said annular ring, and to one of said flanges, said hangers adapted to fit between said auxiliary-hub rings and resiliently supported in such position, a friction-surface between each of said rings, and means to draw said hub out of the center of the wheel structure when the hub is partially rotated relatively to said auxiliary hub, all substantially as shown and described.

9. In a vehicle-wheel, having an auxiliary hub and a primary hub, of hangers pivotally carried by said primary hub and having friction contact with said auxiliary hub to prevent lateral movement, and a pair of supports carried by said hangers and extending inward, all substantially as shown and described.

In testimony whereof I affix my signature in presence of two witnesses.

MARION MILTON BAILEY.

Witnesses:
B. B. ESTERLINE,
F. W. SCHAEFER.